(12) United States Patent
Gross-Rehder et al.

(10) Patent No.: US 12,443,757 B2
(45) Date of Patent: Oct. 14, 2025

(54) AUTOMATIC APPLICATION FEATURE ACTIVATION AND DEACTIVATION ACROSS TIME ZONES

(71) Applicant: SAP SE, Walldorf (DE)

(72) Inventors: Rene Gross-Rehder, Palo Alto, CA (US); Sameer Khatri, Livermore, CA (US); Jason Ou, Santa Clara, CA (US); Milos Milic, Belgrade (RS)

(73) Assignee: SAP SE, Walldorf (DE)

( * ) Notice: Subject to any disclaimer, the term of this patent is extended or adjusted under 35 U.S.C. 154(b) by 253 days.

(21) Appl. No.: 18/306,894

(22) Filed: Apr. 25, 2023

(65) Prior Publication Data

US 2024/0362366 A1   Oct. 31, 2024

(51) Int. Cl.
*G06F 21/00* (2013.01)
*G06F 21/62* (2013.01)

(52) U.S. Cl.
CPC ...... *G06F 21/629* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 5,948,055 A * | 9/1999 | Pulsipher | ................ | H04L 41/22 709/202 |
| 7,533,135 B2 * | 5/2009 | Klein | .................... | G06F 16/289 707/999.203 |
| 8,615,520 B2 * | 12/2013 | Fallah | .................... | G06Q 30/08 707/706 |
| 8,966,599 B1 * | 2/2015 | Barrows | ............. | H04L 63/0846 705/37 |
| 10,365,912 B2 | 7/2019 | Quin et al. | | |
| 10,592,145 B2 * | 3/2020 | Bedadala | .............. | G06F 3/0614 |

(Continued)

FOREIGN PATENT DOCUMENTS

WO    WO 2004019182    3/2004

OTHER PUBLICATIONS

Wikipedia.org [online], "Conditional compilation" Sep. 2007, retrieved on Mar. 14, 2023, retrieved from URL <https://en.wikipedia.org/wiki/Conditional_compilation>, 2 pages.

*Primary Examiner* — Maung T Lwin
(74) *Attorney, Agent, or Firm* — Fish & Richardson P.C.

(57) ABSTRACT

The present disclosure involves systems, software, and computer implemented methods for automatic application feature activation and deactivation across time zones. One example method includes executing a computer application in response to a request. The computer application includes first code for a feature that must be activated before the first code is executed. An activation status query for the feature that includes a local time of the request is transmitted to a second computing device. The second computing device determines an activation status for the feature based on whether the local time of the request is equal to or after a feature activation time for the feature. The activation status for the feature is received from the second computing device. The first code for the feature is executed in response to determining that the activation status for the feature indicates that the feature is active for the context of the request.

18 Claims, 10 Drawing Sheets

(56) References Cited

U.S. PATENT DOCUMENTS

| | | | |
|---|---|---|---|
| 10,630,501 B2* | 4/2020 | Ansari | H04W 12/35 |
| 10,740,490 B2* | 8/2020 | Lee | G06F 21/00 |
| 2005/0044367 A1 | 2/2005 | Gasparini et al. | |
| 2005/0268303 A1* | 12/2005 | Anderson | G06F 9/4881 |
| | | | 718/102 |
| 2007/0039054 A1 | 2/2007 | Mulla et al. | |
| 2007/0107067 A1* | 5/2007 | Fountian | G06F 8/60 |
| | | | 726/33 |
| 2020/0279556 A1* | 9/2020 | Gruber | G06N 5/041 |
| 2020/0331487 A1* | 10/2020 | Darrah, Jr. | B60W 50/085 |
| 2022/0103621 A1 | 3/2022 | Lucas et al. | |
| 2022/0279021 A1* | 9/2022 | Raleigh | G06Q 20/20 |

* cited by examiner

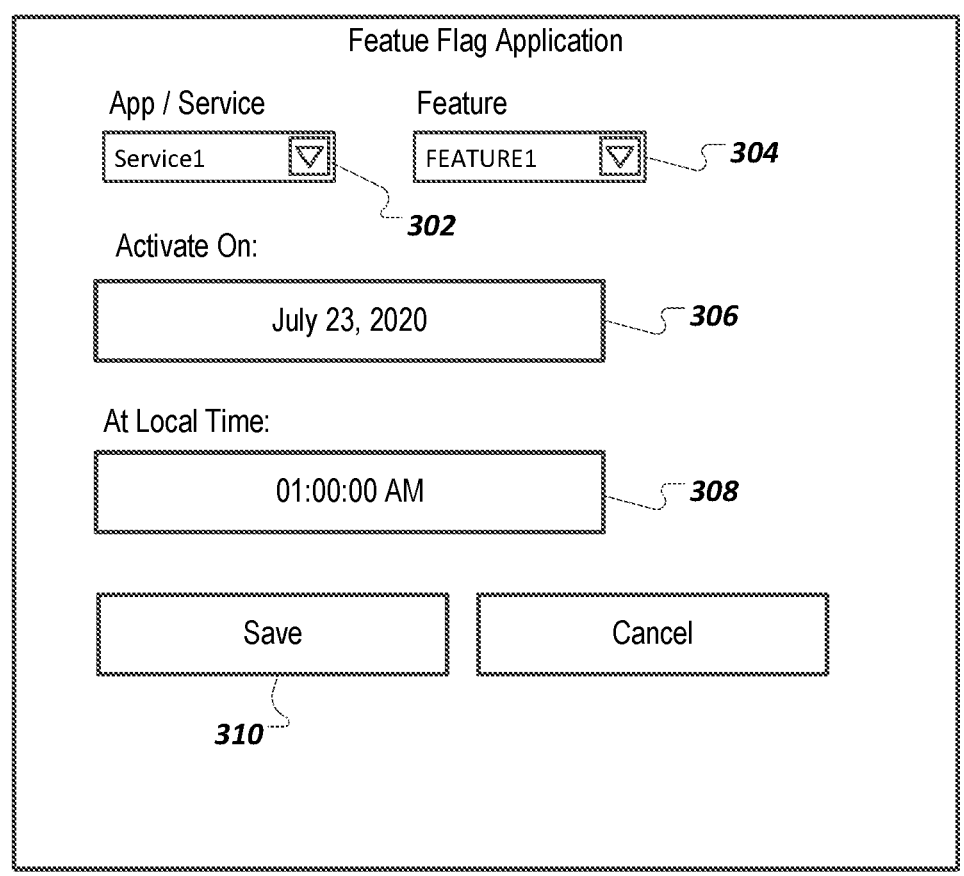
FIG. 3A    300

```
// Feature-flag-wrapped code
if (featureService.isFeatureActive(FEATURE1, localtime)  ⌐356
{
    // feature-related code  ⌐358
}
```
⎱ 354

```
// Feature service code
featureService.isFeatureActive(FEATURE, localtime) {  ⌐360
    activeTime = lookupFeature(FEATURE);
    // null means simply not active
    // non-null means active starting at active time
    if activeTime = null return false;  ⌐362
    if (localtime >= activeTime)  ⌐364
        return true;
    else
        return false;
}
```
⎱ 352

FIG. 3B  350

AUTOMATIC APPLICATION FEATURE ACTIVATION AND DEACTIVATION ACROSS TIME ZONES

TECHNICAL FIELD

The present disclosure relates to computer-implemented methods, software, and systems for automatic application feature activation/deactivation across time zones.

BACKGROUND

Software developers can provide systems to their customers that in many ways include the use of continuous integration (CI) and/or continuous delivery (CD). For example, continuous integration can involve merging of small changes into a main branch. Continuous delivery can involve producing and releasing software in short cycles. As another example, software developers can also use continuous deployment that involves automated deployments of the software changes produced in the short cycles used for continuous delivery.

In such deployment environments, issues can arise as to the timing of new features being available to customers. If every customer around the world receives a new feature at the same time, especially when many employees of those customers are working across the world, some employees of certain customers will receive a change in operation of the software in the middle of their workday that may cause errors or unexpected behavior from the software.

This problem will also manifest itself when a single customer is running multiple instances of a software application. A software developer deploying a change to an instance executing for one employee of a customer may cause similar issues for that employee depending on the point of time during that employee's normal workday. However, other employees of that customer may not be impacted as they may not be executing any instances of that software application at the time of deployment.

SUMMARY

The present disclosure involves systems, software, and computer implemented methods for automatic application feature activation/deactivation across time zones. An example method is provided for executing a computer application on a first computing device. The computer application includes first code for a first feature that must be activated before the first code is executed and second code. The example method includes: executing the computer application in response to a request. Executing the computer application in response to the request includes: executing an activation check for the first feature to determine whether the first feature is active for a context of the request, wherein executing the activation check comprises transmitting an activation status query for the first feature that includes a first local time of the request to a second computing device, wherein the second computing device determines an activation status for the first feature for the activation status query based on whether the first local time of the request is equal to or after a feature activation time for the first feature; receiving the activation status for the first feature for the activation status query from the second computing device; executing the first code for the first feature in response to determining that the activation status for the first feature indicates that the first feature is active for the context of the request; and executing the second code in response to determining that the activation status for the first feature indicates that the first feature is not active for the context of the request.

Implementations can include one or more of the following features. The first code can be alternative code to the second code, where the second code is not executed during a first execution of the computer application in which the first code is executed and where the second code is executed during a second execution of the computer application in which the first code is not executed. The first code can be a revised version of the second code. The second code can be executed unconditionally during a first execution of the computer application regardless of whether the first code is executed during the first execution of the computer application. The first computing device can be a server computing device that executes server code on behalf of multiple client devices associated with multiple different users. The first computing device can be a client device associated with a first user.

Another example method is provided that is executed on a first computing device that includes a feature activation database where at least one entry in the feature activation database has a feature identifier and a feature activation time and where the at least one entry is associated with a first feature of a first computer application having first code for the first feature that must be activated before the first code is executed and second code. The example method includes: receiving a first feature activation status query from a second computing device that executes an instance of the first computer application, where the first feature activation status query inquires whether the first feature is active for a first requester; determining, from information in the first feature activation status query, a first local time local to the first requester; retrieving, from the feature activation database, a first feature activation time for the first feature; determining whether the first local time is equal to or after the first feature activation time; responding to the first feature activation status query by transmitting a feature-active indication to the second computing device that indicates that the first feature is active and executable for the first requester on the second computing device in response to determining that the first local time is equal to or after the first feature activation time, where the second computing device executes the first code in response to receiving the feature-active indication; and responding to the first feature activation status query by transmitting a feature-inactive indication to the second computing device that indicates that the first feature is inactive and not executable for the first requester on the second computing device in response to determining that the first local time is not equal to or after the first feature activation time, where the second computing device executes the second code and not the first code in response to receiving the feature-inactive indication.

Implementations may include one or more of the following features. The second computing device can be a server computing device that executes server code on behalf of multiple client devices associated with multiple different users and the first requester can be a first client device. The second computing device can be a client device associated with a first user. After responding to the first feature activation status query by transmitting the feature-active indication to the second computing device that indicates that the first feature is active and executable for the first requester on the second computing device, a second feature activation status query can be received for the first feature from a third computing device for a second requester. A determination can be made that a second local time local to the second requester is before the first feature activation time. A response can be sent, while the first feature is active for the first requester, for the second feature activation status query by transmitting a feature-inactive indication to the third computing device that indicates that the first feature is inactive and not executable for the second requester on the third computing device. After responding to the second feature activation status query by transmitting the feature-inactive indication to the third computing device that indicates that the first feature is inactive and not executable for the second requester on the third computing device, a third feature activation status query can be received for the first feature from the third computing device for the second requester. A determination can be made that a third local time local to the second requester is after the first feature activation time. A response can be sent for the third feature activation status query by transmitting the feature-active indication to the third computing device that indicates that the first feature is active and executable for the second requester on the third computing device. System health data can be monitored for at least one system corresponding to the computer application. A determination can be made, based on monitored system health data, that an issue is attributable to activation of the first feature. The first feature can be automatically deactivated in response to determining that the issue may be attributable to activation of the first feature. A notification can be sent to an administrator in response to determining that the issue may be attributable to activation of the first feature. Monitored system health data can be general health data associated with multiple features and/or feature-specific health data specific to the first feature. After the first feature has been deactivated and after the second computing device has previously executed the first code at least once, a second feature activation status query can be received for the first feature from the second computing device for the first requester. A determination can be made that the first feature has been deactivated. Based on determining that the first feature has been deactivated, a response can be sent for the second feature activation status query by transmitting a feature-inactive indication to the second computing device that indicates that the first feature is inactive and not executable for the first requester on the second computing device.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 3A illustrates an example user interface for configuring feature activation.

FIG. 3B illustrates example pseudocode for feature activation.

DETAILED DESCRIPTION

Figure 1:
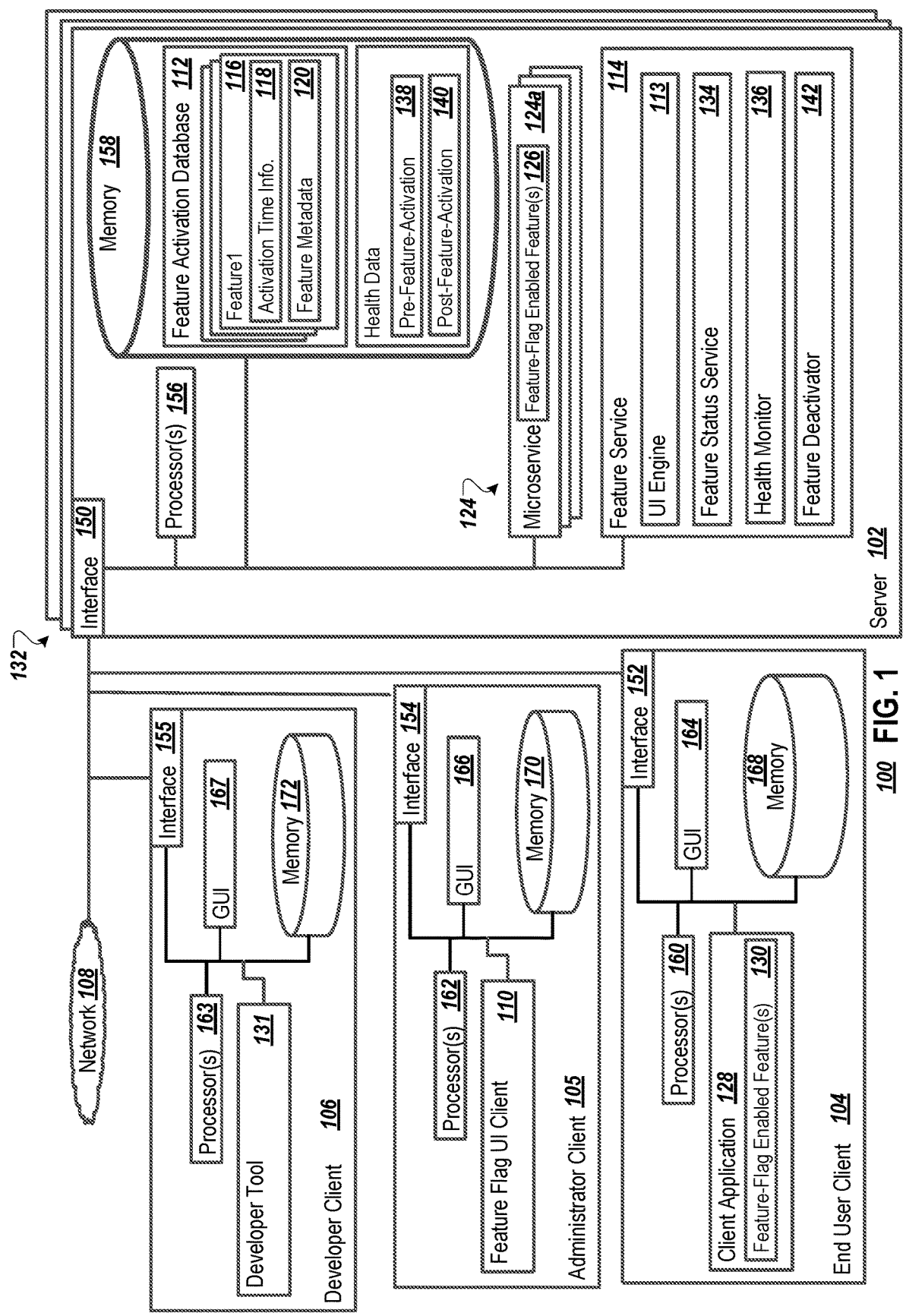
FIG. 1 is a block diagram illustrating an example system for automatic application feature activation/deactivation across time zones.

As part of CI/CD or other integration or deployment processes, deployed code from a software developer can include feature toggles or flags that can be used in conditional checks that can be performed during execution of the code to determine whether code associated with a feature is to be executed. Feature flags can be used for various types of features, such as new application features, code associated with a new application version, or a feature related to integration with another application or service, to name a few examples. Feature flags can be used for various types of different-sized features that are designed to be turned on or off for different reasons. In some cases, features in deployed code are initially inactive when the code is first deployed by a software developer and features can be activated at a later time by the software developer or by an administrator of the software being used by the customer.

Accordingly, in CI/CD environments in particular, as new code is continuously deployed, a need exists for control of the activation of certain code that is wrapped in feature flags to control when certain features become active and visible to end users or other software applications. For cloud products that have a global scale and global reach, controlling feature flag activation across time zones can present specific challenges and problems. Problems can exist with different previous approaches, for example, that involve setting a global activation time or that involve manual activation per time zone or region.

For example, activating a feature using one global activation time can result in confusing user experiences, and can result in an increased risk of users experiencing negative side effects that may result due to feature activation. For instance, suppose a software provider wants to enable a feature in all production systems that results in a visible change to a user interface. If the software provider activates the feature globally on a Sunday in a United States time zone, that feature also becomes active during Monday business hours during Asia time zones. A sudden change in a user interface may disrupt or confuse users who are currently using that user interface. Additionally, if activating the feature causes regression issues, activating the feature during peak hours for Asia users may result in negative impacts to users using the features during peak hours.

As another example, prior approaches may have involved administrators manually logging into different servers across different time zones and manually configuring feature activation in different servers. Such manual approaches may be resource-intensive and error-prone, as administrators may forget to activate a feature on a given server, may activate the feature after a desired time, etc. Additionally, prior approaches may have involved manual, haphazard approaches for monitoring potential side effects of feature activation. Manual monitoring may also be resource-intensive and error-prone, since administrators may fail to identify a given regression issue, fail to check or detect an issue involving certain servers serving certain locales, etc. In prior systems, deactivation of a feature across different time zones in response to detected regression may also involve manual, error-prone processes. An administrator may fail to or forget to deactivate the feature for certain users or may not be able to timely deactivate the feature in all time zones, thereby increasing a risk for additional negative side effects to occur while the feature remains active for at least some users.

To solve these and other problems, a feature activation service can be used for automatic application feature activation and deactivation across time zones. For example, the feature service can be used for automatic feature flag activation based on a local time of a feature consumer rather than using one static global activation time. The feature service can support feature activation scheduling, responding to feature activation status requests, and feature deactivation. Feature activation scheduling can involve setting an activation day and/or activation time (activation day/time) for a given feature. Interpretation of the activation day/time is done with respect to a local time of a feature consumer.

For example, actual feature activation can be performed in response to an application or other feature consumer sending a query to a feature service requesting a feature activation status of a given feature. The feature service can determine a local time of the request local to the requester, and can then compare that local time to a scheduled feature activation time. If the local time is at or after the feature activation time, the feature service can respond to the requester with an indication that the feature is active for the requester. Otherwise the feature service can respond to the request with an indication that the feature is not active for the requester. The requester can handle the response from the feature service by conditionally executing code wrapped in a feature flag for the feature based on whether the feature service indicated the feature is active for the requester.

The feature service system can also support automatic feature deactivation. For example, automatic health checks can be performed after a feature is activated. If a potential regression is detected by automatic health monitoring, the feature can be automatically deactivated (e.g., by setting a feature status to inactive). The feature service can respond to subsequent requests by applications for a feature activation status of the feature with an indication that the feature is inactive. Additionally, appropriate alerts or notifications can be automatically generated and provided when a feature is automatically deactivated.

The feature service solution therefore provides various technical advantages and benefits. The automatic feature activation solution uses a "follow-the-sun" approach that can ensure that actual feature activation for respective feature consumers occurs with respect to a desired activation time local to the feature consumer, thereby reducing negative feature activation risk and impact. Additionally, automatically enabling features during off-peak hours for each feature consumer for all feature consumer time zones combined with automatic health monitoring can increase a likelihood that detection of side effects and feature deactivation can also occur during off-peak hours before peak hours arrive for end users in respective time zones. Additionally, automatic feature activation and deactivation can use less resources and result in more accurate and timely feature activation and deactivation for all global feature consumers, as compared to manual approaches. For example, maintenance of a single activation time per feature results in less storage and maintenance costs as compared to maintenance of separate different activation times for different locations. Automatic health monitoring after feature activation can result in faster correlation of a problem to a respective feature activation, as compared to approaches that don't use such monitoring. Accordingly, appropriate feature deactivation and problem resolution can occur more quickly as compared to other approaches, which can result in a more robust and correct production system.

FIG. 1 is a block diagram illustrating an example system 100 for automatic application feature activation/deactivation across time zones. Specifically, the illustrated system 100 includes or is communicably coupled with a server 102, an end-user client device 104, an administrator client device 105, a developer client device 106, and a network 108. Although shown separately, in some implementations, functionality of two or more systems or servers may be provided by a single system or server. In some implementations, the functionality of one illustrated system, server, or component may be provided by multiple systems, servers, or components, respectively.

An administrator can use a feature flag UI (User Interface) client 110 running on the administrator client device 105 to configure feature information for features in a feature activation database 112. The feature flag UI client 110 can present a user interface provided by a UI engine 113 of a feature service 114, for example. For instance, the administrator can configure, for a feature 116 (e.g., "Feature1"), activation time information 118 (to be interpreted with respect to local time information of a feature consumer) and feature metadata 120. The feature metadata 120 can be used during feature health monitoring by a health monitor 122, as described below.

The server 102 can be part of a cloud platform, for example, and can provide various microservices 124 including a microservice 124a. The microservice 124a can include feature-flag enabled feature(s) 126 (e.g., conditional feature code that is wrapped in a conditional check that determines whether a certain feature is active). The server 102 can also provide client code and/or a client application 128 to the end-user client device 104. The client application 128 includes feature-flag enabled feature(s) 130, for example. Code for the feature-flag enabled feature(s) 126 and for the feature-flag enabled feature(s) 130 can be developed by a developer using a developer tool 131 on the developer client 106, for example.

The feature service 114 is shown as running on the server 102 but the feature service 114 can run on a different server, or multiple servers. Additionally, a software provider may provide applications or services using multiple servers or datacenters. For example, the server 102 may be one server in a group of servers 132. Each server in the group of servers 132 may be a single server or may be a datacenter of multiple servers. In some cases, each datacenter is configured to respond to requests from clients or consumers in a given region. Regardless of server/datacenter configuration, the software provider can deploy feature-flag enabled code to the various server(s) or datacenter(s).

After code has been deployed, the feature service 114 can be configured to respond to feature activation status requests, for example, that are sent from the client application 128 or from a backend component such as the microservice 124a or other server. For example, a feature status service 134 portion of the feature service 114 can receive a request from the client application 128 for activation status of a first feature of the client application 128.

The feature status service 134 can determine, from information in the request, a local time local to client application 128 and the end-user client device 104. In general, the feature status service 134 can determine a local time local to a requester. As another example, if the request is from the microservice 124a when the server 102 is configured to service a particular region, the local time may be a time local to the region. In some cases, the request includes a local time, and, in other cases, the feature status service 134 can determine the local time from other information in the request, such as location information and a timestamp that is not local to the request (e.g., by performing a time zone conversion/adjustment operation).

After the feature status service 134 has determined, for the request, a local time of the requester, the feature status service 134 can query the feature activation database 112 to determine whether the feature activation database 112 includes feature activation time information for the requested feature. If the feature activation database 112 does not include feature activation time for the feature, the feature status service 134 can respond (or the feature service 114 itself can respond) to the request with information that indicates that the feature is not active. If the feature status service 134 determines that the feature activation database 112 includes feature activation time information for the feature, the feature status service 134 can compare the feature activation time information for the feature to the local time of the requester, to determine whether the local time is before the feature activation time.

The feature service 114 can respond to the request with information that indicates that the feature is not active for the requester in response to determining that the local time of the requester is before the feature activation time. The feature service 114 can respond to the request with information that indicates that the feature is active for the requester in response to determining that the local time of the requester is at or after the feature activation time. The requester (e.g., the client application 128, the microservice 124a, or some other requester) can be configured to execute feature flag wrapped code in response to receiving an indication from the feature service 114 that the feature is active for the requester and to skip execution of the feature flag wrapped code in response to receiving an indication from the feature service 114 that the feature is not active for the requester.

After a feature is activated, a health monitor 136 can monitor health of servers or systems or devices that may be affected by execution of code related to the feature. The health monitor 136 can monitor various health measures after the activation of the feature and compare various health measurements for a time period after feature activation to a time period before feature activation. The health monitor 136 may detect an issue that may be attributable to activation of the feature by detecting a difference between pre-feature-activation health data 138 and post-feature-activation health data 140, for example. For example, the health monitor 136 may determine that there is an issue attributable to an activated feature by determining that there has been a spike in warning or exception log entries. As another example, the health monitor 136 may determine there is an issue attributable to an activated feature by determining an increase in help queries related to the feature since activation of the feature.

While monitored health data can include general health indicators such as a count of warnings or exceptions found in logs, monitored health data can also include feature-specific health data. For example, the health monitor 136 can perform monitoring based on the feature metadata 120 for an activated feature. The feature metadata 120 may include information such as application area(s) related to the feature, microservice(s) that are related to the feature, integration check(s) related to the feature, etc. The health monitor 136 may gather health data specific to application areas, services, or integration checks listed in the feature metadata 120 for the feature, for example.

In response to the health monitor 136 detecting an issue with an activated feature, a feature deactivator 142 can automatically deactivate the feature. For example, the feature deactivator 142 may clear or delete an entry for the feature in the feature activation database 112. The feature deactivator 142 (or another component of the feature service 114) can also trigger automatic notifications, to be presented to an administrator on the administrator client device 105, for example, regarding issue detection and automatic feature deactivation. Once a feature has been deactivated, the feature status service 134 can respond to status requests for the feature with an indication that the feature is not active.

As used in the present disclosure, the term "computer" is intended to encompass any suitable processing device. For example, although FIG. 1 illustrates a single server 102, a single end-user client device 104, a single administrator client device 105, and a single developer client device 106, the system 100 can be implemented using a single, stand-alone computing device, two or more servers 102, or multiple client devices. Indeed, the server 102 and the client devices 104 and 105 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client devices 104 and 105 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 150, 152, 154, and 155 are used by the server 102, the end-user client device 104, the administrator client device 105, and the developer client device 106, respectively, for communicating with other systems in a distributed environment—including within the system 100—connected to the network 108. Generally, the interfaces 150, 152, 154, and 155 each comprise logic encoded in software and/or hardware in a suitable combination and operable to communicate with the network 108. More specifically, the interfaces 150, 152, 154, and 155 may each comprise software supporting one or more communication protocols associated with communications such that the network 108 or interface's hardware is operable to communicate physical signals within and outside of the illustrated system 100.

The server 102 includes one or more processors 156. Each processor 156 may be a central processing unit (CPU), a blade, an application specific integrated circuit (ASIC), a field-programmable gate array (FPGA), or another suitable component. Generally, each processor 156 executes instructions and manipulates data to perform the operations of the server 102. Specifically, each processor 156 executes the functionality required to receive and respond to requests from the end-user client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 158. In some implementations, the server 102 includes multiple memories. The memory 158 may include any type of memory or database module and may take the form of volatile and/or non-volatile memory including, without limitation, magnetic media, optical media, random access memory (RAM), read-only memory (ROM), removable media, or any other suitable local or remote memory component. The memory 158 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The end-user client device 104, the administrator client device 105, and the developer client device 106 may each generally be any computing device operable to connect to or communicate with the server 102 via the network 108 using a wireline or wireless connection. In general, the end-user client device 104, the administrator client device 105, and the developer client device 106 each comprise an electronic computer device operable to receive, transmit, process, and store any appropriate data associated with the system 100 of FIG. 1. The end-user client device 104, the administrator client device 105, and the developer client device 106 can each include one or more client applications, including the client application 128, the feature flag UI client 110, or the developer tool 131, respectively. A client application is any type of application that allows the end-user client device 104, the administrator client device 105, or the developer client device 106 to request and view content on a respective client device. In some implementations, a client application can use parameters, metadata, and other information received at launch to access a particular set of data from the server 102. In some instances, a client application may be an agent or client-side version of the one or more enterprise applications running on an enterprise server (not shown).

The end-user client device 104, the administrator client device 105, and the developer client device 106 respectively include processor(s) 160, processor(s) 162, or processor(s) 163. Each processor 160, 162, or 163 included in the end-user client device 104, the administrator client device 105 or the developer client device 106 may be a central processing unit (CPU), an application specific integrated circuit (ASIC), a field-programmable gate array (FPGA), or another suitable component. Generally, each processor 160, 162, or 163 included in the end-user client device 104, the administrator client device 105, or the developer client device 106 executes instructions and manipulates data to perform the operations of the end-user client device 104, the administrator client device 105, or the developer client device 106, respectively. Specifically, each processor 160, 162, or 163 included in the end-user client device 104, the administrator client device 105, or the developer client device 106 executes the functionality required to send requests to the server 102 and to receive and process responses from the server 102.

The end-user client device 104, the administrator client device 105, and the developer client device 106 are each generally intended to encompass any client computing device such as a laptop/notebook computer, wireless data port, smart phone, personal data assistant (PDA), tablet computing device, one or more processors within these devices, or any other suitable processing device. For example, the end-user client device 104, the administrator client device 105, and/or the developer client device 106 may comprise a computer that includes an input device, such as a keypad, touch screen, or other device that can accept user information, and an output device that conveys information associated with the operation of the server 102, or the respective client device itself, including digital data, visual information, or a GUI (Graphical User Interface) 164, a GUI 166, or a GUI 167 respectively.

The GUIs 164, 166, and 167 interface with at least a portion of the system 100 for any suitable purpose, including generating a visual representation of the client application 128, the feature flag UI client 110, or the developer tool 131, respectively. In particular, the GUI 164, the GUI 166, and/or the GUI 167 may be used to view and navigate various Web pages. Generally, the GUI 164, the GUI 166, and the GUI 167 each provide a respective user with an efficient and user-friendly presentation of business data provided by or communicated within the system. The GUI 164, the GUI 166, and the GUI 167 may each comprise a plurality of customizable frames or views having interactive fields, pull-down lists, and buttons operated by the user. The GUI 164, the GUI 166, and the GUI 167 each contemplate any suitable graphical user interface, such as a combination of a generic web browser, intelligent engine, and command line interface (CLI) that processes information and efficiently presents the results to the user visually.

Memory 168, memory 170, and memory 170 included in the end-user client device 104, the administrator client device 105, or the developer client device 106, respectively, may each include any memory or database module and may take the form of volatile or non-volatile memory including, without limitation, magnetic media, optical media, random access memory (RAM), read-only memory (ROM), removable media, or any other suitable local or remote memory component. The memory 168, the memory 170, and the memory 170 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the associated client device.

There may be any number of end-user client devices 104, administrator client devices 105, and/or developer client devices 106 associated with, or external to, the system 100. For example, while the illustrated system 100 includes one end-user client device 104, alternative implementations of the system 100 may include multiple end-user client devices 104 communicably coupled to the server 102 and/or the network 108, or any other number suitable to the purposes of the system 100. Additionally, there may also be one or more additional end-user client devices 104 external to the illustrated portion of system 100 that are capable of interacting with the system 100 via the network 108. If there are multiple end user devices 104, each of the end user devices 104 can each run an instance of a software application deployed by a software developer. Thus, multiple end user clients 104 may be executing multiple instances of a software application at either concurrent times or divergent times, especially if the end user client devices 104 are spread over multiple time zones. Further, the term "client", "client device" and "user" may be used interchangeably as appropriate without departing from the scope of this disclosure. Moreover, while the end-user client device 104, the administrator client device 105, and the developer client device 106 may be described in terms of being used by a single user, this disclosure contemplates that many users may use one computer, or that one user may use multiple computers.

Figure 2A:
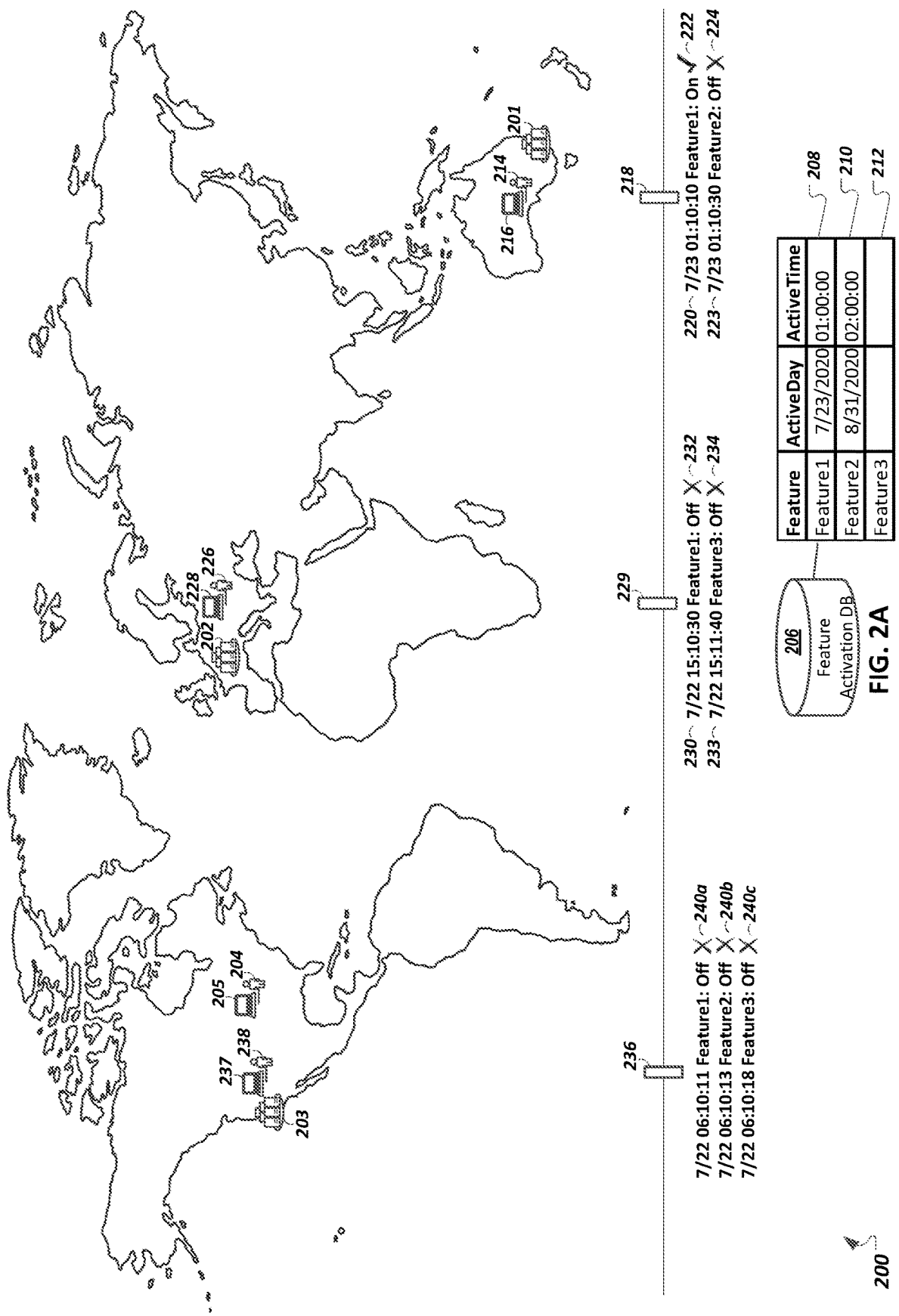
FIGS. 2A-2D illustrate an example system that handles different examples of application feature activation/deactivation across time zones.

FIGS. 2A-2D illustrate an example system 200 that handles different examples of application feature activation/deactivation across time zones. As shown in FIG. 2A, code for feature1, feature2, and feature3 features is distributed globally, e.g., to data centers such as a data center 201 in Australia, a data center 202 in Europe, and a data center 203 in California. Different numbers of data centers may be used and each data center may serve different areas. Three data centers, with respective clients of those data centers in a respective nearby location are illustrated, but other data center arrangements and coverage are possible. Code for feature1, feature2, and feature3 can be developed by a developer 204 using a computing device 205, for example, and distributed to the data center 201, the data center 202, and the data center 203.

A feature activation database 206 used by a feature service has entries 208, 210, and 212 for feature1, feature2, and feature3, respectively. The feature service may be provided by one or more of the illustrated data centers. The feature activation database 206 indicates that feature1 is to become active on 7/23/2020 at 01:00:00 local time and that feature2 is to become active on 8/31/2020 at 02:00:00 local time. The entry for feature3 does not list an activate day or activate time, so there is currently no plan to activate feature3. Accordingly, feature3 is inactive.

When application code that includes a feature is run, a request can be sent by the application to the feature service to determine whether the feature is active. If the feature is active, code for the feature can be executed. If the feature is not active, code for the feature can be skipped. The feature service can look up an entry in the feature activation database 206 and determine if an activate day and activate time are listed for the feature. If an activate day and activate time are listed for the feature, the feature service can compare a local time that is local to the requesting application (e.g., the requesting application instance) to the activate day and activate time. If the local time is after the activate day and activate time, the feature service can respond to the request indicating that the feature is active. Otherwise, the feature service can respond to the request indicating that the feature is not active.

For example, a user 214 using a computing device 216 in Australia may use application features of an application that correspond to feature1 and feature2 at a time 218 that corresponds to a local time 220 of 7/23/2020 01:10:10. When code that includes feature1 is encountered when executing the application code, the application can send a request to the feature service to inquire whether feature1 is active. The application can send information that can be used by the feature service to determine a local time (e.g., local to the computing device 216) of the request. For example, the application can send a timestamp that reflects a current local time or the application can send a timestamp (e.g., of a time in a standard time zone such as GMT (Greenwich Mean Time)) and location information for the computing device 216 (e.g., where the location information can be GPS (Global Positioning Satellite) information or a time zone local to the computing device 216). The feature service can thus either receive or determine a local time of the request that is local to the computing device 216.

In response to the request from the computing device 216, the feature service can retrieve, from the feature activation database 206, activation time information (e.g., an activate day and an activate time) from the entry 208 corresponding to feature1. The feature service can compare the local time of the request (e.g., the local time 220 of 7/23/20 01:10:10) to the retrieved activation time information for feature1 (e.g., 7/23/20 01:00:00). In this example, the local time 220 of the request is after a time reflected in the activation time information. Accordingly, the feature service can respond to the request from the application running on the computing device 216 with information that indicates that feature1 is active, as illustrated by a symbol 222.

The application running on the computing device 216 may also send a request (e.g., at a local time 223 that is twenty seconds later than the local time 220) to inquire whether feature2 is active. The feature service can retrieve, from the feature activation database 206, activation time information from the entry 210 corresponding to feature2. The feature service can compare the local time 223 of 7/23/20 01:10:30) to the retrieved activation time information of 8/31/20 02:00:00. In this example, the local time 223 of the request is before a time reflected in the activation time information for feature2. Accordingly, the feature service can respond to the request from the application running on the computing device 216 with information that indicates that feature2 is inactive, as illustrated by a symbol 224. These examples involving the computing device 216 illustrate that for a given application instance, a first feature may be active while a second feature is inactive.

FIG. 2A also illustrates a given feature being active for a first instance of an application but inactive for a second instance of the application, based on local current time for the different instances. For example, a user 226 using a computing device 228 may use an application and the application may send a request to the feature service to inquire whether feature1 is active. The request is sent at a time 229 that corresponds to a local time 230 of 7/23/20 14:10:30, which is substantially a same time of receipt by the feature service (e.g., within one minute) of the local time 220 of the request sent by the computing device 216 (even though both request times are substantially different (e.g., multiple hours apart) with respect to local time. For example, it may be just after 1:00 AM local time for the computing device 216 in Australia while it is just after 3:00 PM local time the prior day for the computing device 228 in Europe.

In response to the request sent from the computing device 228, the feature service can retrieve, from the feature activation database 206, activation time information from the entry 208. The feature service can compare the local time of the request (e.g., the local time 230 of 7/22/20 15:10:30) to the retrieved activation time information of 7/23/20 01:00:00 for feature1. In this example, the local time 230 of the request is before a time reflected in the activation time information for feature1. Accordingly, the feature service can respond to the request from the application running on the computing device 228 with information that indicates that feature1 is inactive, as illustrated by a symbol 232.

In a similar manner, the application running on the computing device 228 can send a request (e.g., at a local time 233) about an active status of feature3. The feature service can determine that no activate day or activate time information exists in the feature activation database for feature3. Accordingly, the feature service can respond to the request regarding feature3 with an indication that feature3 is not active, as illustrated by a symbol 234.

In a similar timeframe (e.g., illustrated as a time point 236) as when requests are sent to the feature service from the computing device 216 and the computing device 228, a computing device 237 of a user 238 can also send requests to the feature service, such as for feature1, feature2, and feature3. A local time of these requests is shortly after 6:00 AM local time on 7/22/20. The feature service can respond to respective requests from the computing device 237 for feature1, feature2, and feature3 with indications indicating those features are currently inactive, as illustrated by symbols 240a, 240b, and 240c, respectively.

Although the example of FIG. 2A and following examples illustrate the different computing devices sending requests for certain features, any computing device can send a request for any feature included in deployed code. Actual requests may depend on run time conditions, user input, etc. Although feature1 is not active for the user 226 or the user 238 based on their current local time, feature1 will become active for those users within a matter of hours, as described below, and the feature service can respond accordingly, with an active status for feature1, once a respective local time is after the activation time for feature1.

Figure 2B:
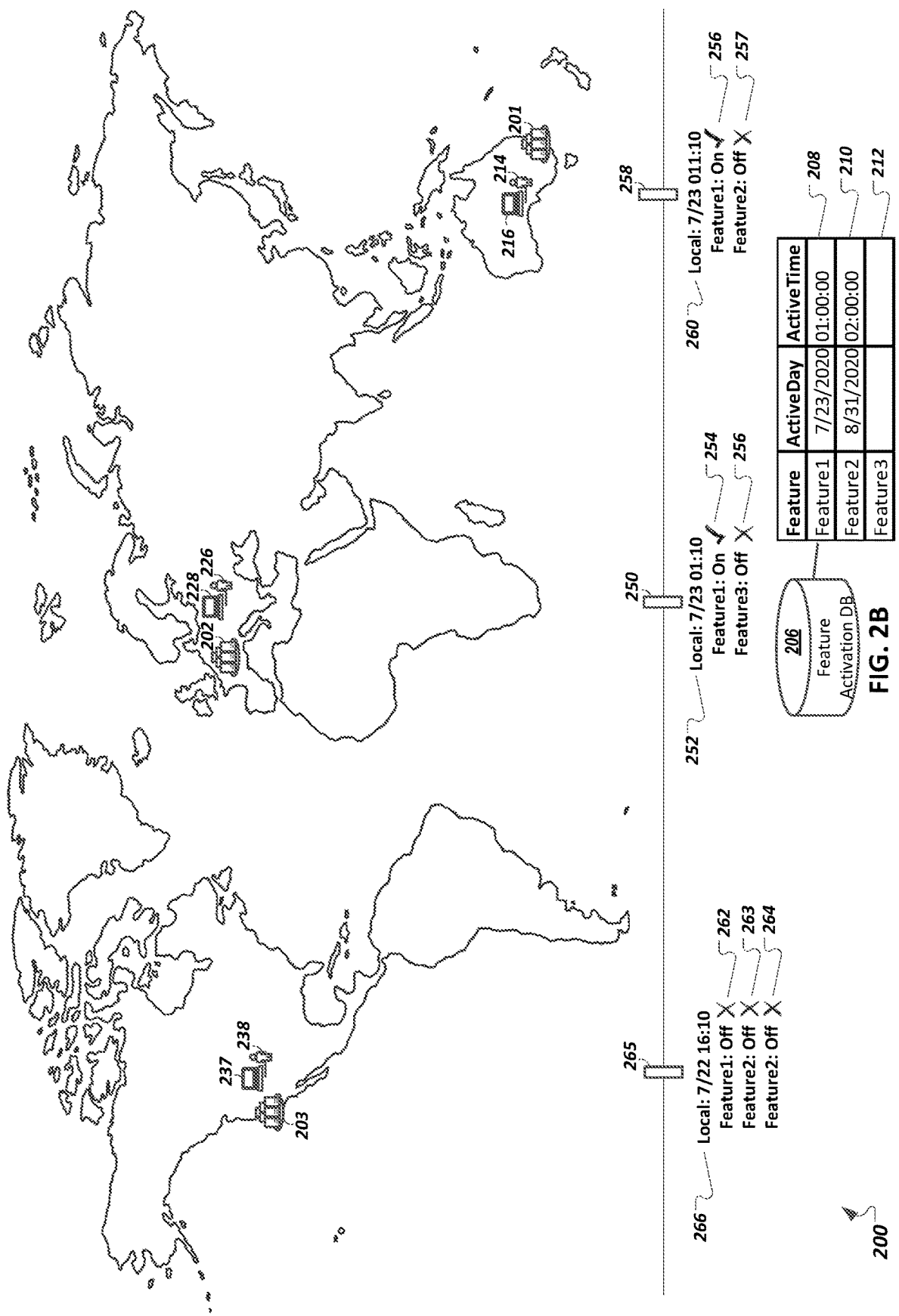

For example and as shown in FIG. 2B, the computing device 228 can send different requests to the feature service for different features (e.g., feature1, feature3) during a timeframe 250 (e.g., a timeframe one minute long) that corresponds to a local time 252 of July 23 01:10 AM. As illustrated by a symbol 254, the feature service can respond to a request from the computing device 228 for feature1 with an indication that feature1 is now active for the computing device 228 based on the local time 252 being after the activation time information for feature1 included in the entry 208 in the feature activation database 206. As indicated by a symbol 256, the feature service can respond to a request from the computing device 228 during the timeframe 250 for feature3 with an indication that feature3 is still not active.

The feature service can continue to respond to requests for feature1 and feature2 sent by the computing device 216 in a manner similar to that described above with respect to FIG. 2A. That is, as indicated by symbols 256 and 257, the feature service can respond to respective requests sent by the computing device 216 during a timeframe 258 corresponding to a local time 260 of 7/23 11:10 PM with information that indicates that feature1 is still active and that feature2 is not yet active, respectively. Similarly, as indicated by symbols 262, 263, and 264, the feature service can respond to different requests for feature1, feature2, and feature3 sent by the computing device 237 during a timeframe 265 corresponding to a local time 266 of 7/22 4:10 PM with indicators indicating that a respective feature is not active for the time zone of the computing device 237, respectively. As described below, feature1 will become active for the computing device 237 in a matter of hours once the local time of the computing device 237 reaches the activation date/time included in the entry 208. That is, once the local time associated with requests sent by the computing device 137 is at or after the activation date/time included in the entry 208, the feature service can respond to such requests with an indication that feature1 is currently active for the computing device 137.

Figure 2C:
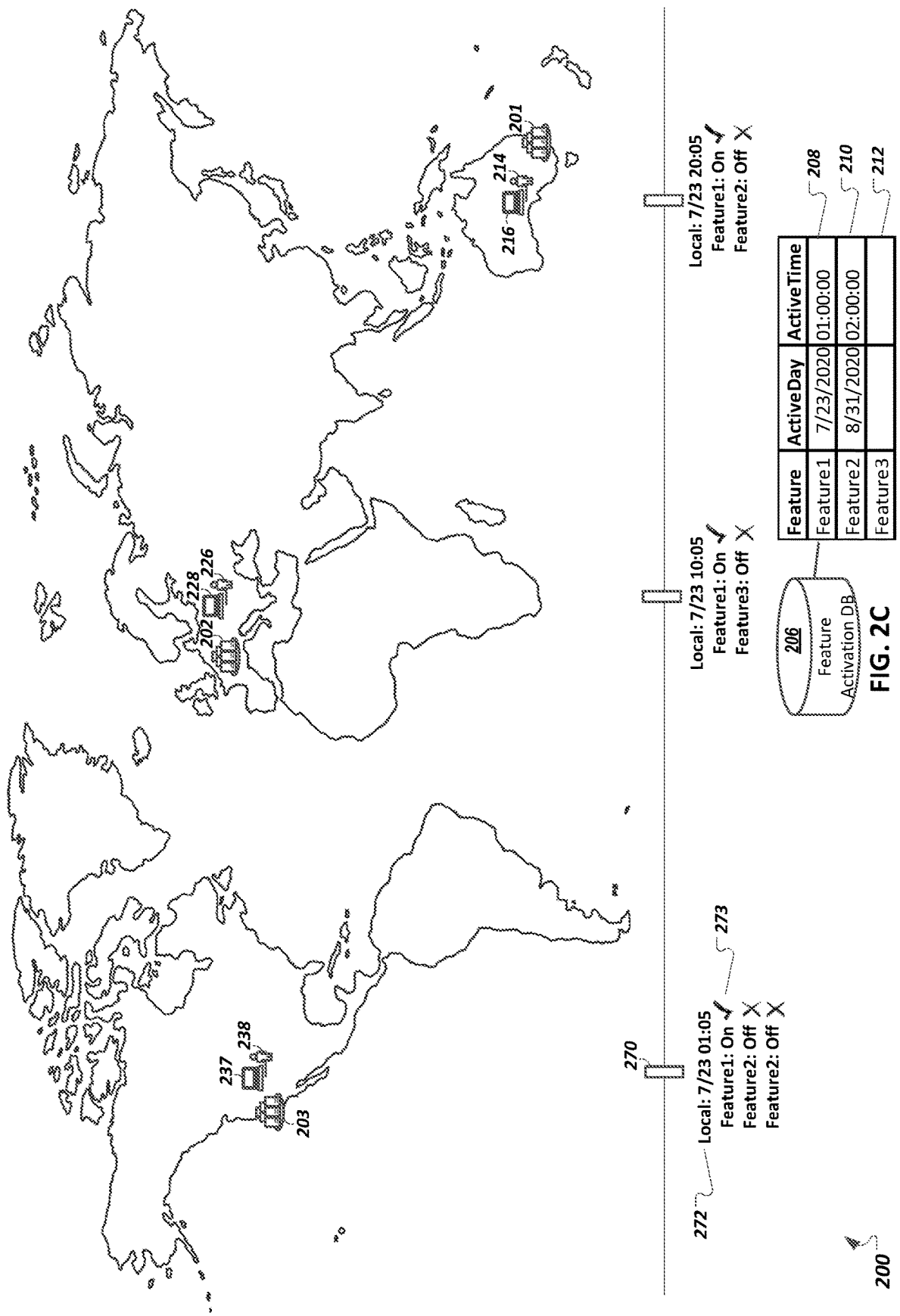

For instance and as shown in FIG. 2C, the computing device 237 sends a request to the feature service for feature1 during a timeframe 270 corresponding to a local time 272 of 7/23 01:05 AM. As illustrated by a symbol 273, the feature service can respond to a request from the computing device 237 for feature1 with an indication that feature1 is now active for the computing device 237 based on the local time 272 being after the activation time information for feature1 included in the entry 208 in the feature activation database 206. The computing devices 216 and 228 may send requests for feature1, feature2, and/or feature3 as described above and the feature service can continue to send similar indications (e.g., that feature1 is active and that feature2 and feature3 are not active) in response to requests sent by those devices. As shown in FIG. 2C, feature1 is now active in time zones spanning from east to west from at least the time zone of the computing device 216 to the time zone of the computing device 237.

Figure 2D:
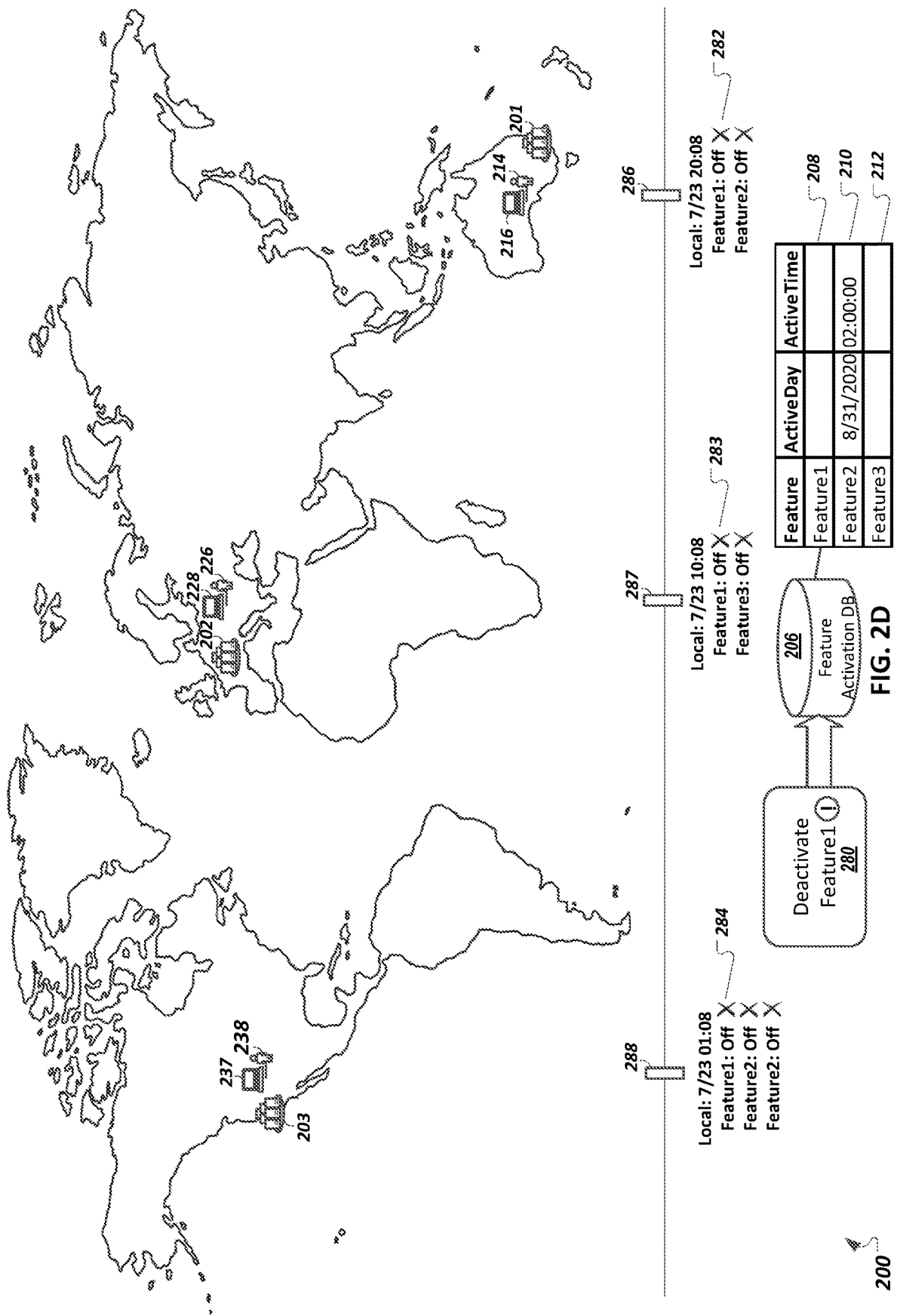

FIG. 2D illustrates handling of feature deactivation. A deactivate feature event 280 for feature1 can occur due to various reasons. For example, a feature can be deactivated in response to an input from an administrator. As another example, a deactivate feature event can be generated in response to detection of a system health condition that may be attributable to prior activation of the feature, as described above. Handling of the deactivate feature event 280 for feature1 can result in a clearing (or removing) of the entry 208 in the feature activation database 206 for feature1.

The clearing or removing of the entry 208 can result in the feature service responding to subsequent requests for feature1 with an indication that feature1 is not currently active. For example, symbols 282, 283, and 284 reflect feature-inactive status values sent by the feature service in response to requests for feature1 sent by the computing devices 216, 228, and 237 during timeframes 286, 287, and 288 that are after generation of the deactivate feature event 280, respectively.

FIG. 3A illustrates an example user interface 300 for configuring feature activation. An administrator can use the user interface 300, for example. An application or service for which the feature is to be configured can be selected using a user interface (UI) control 302. For example, "Service1" has been selected. A feature to be configured can be selected (or entered) using a UI control 304. For example, "FEATURE1" has been selected. An activate day and activate time can be configured using an activate day UI control 306 and an activate time UI control 308, respectively. For example, an activation day of Jul. 23, 2020 and an activate time of 1:00 AM have been configured. Information specified or changed using the UI 300 can be saved in response to selection of a save UI control 310. For example, information from the UI 300 can be saved in a feature activation database used by a feature service. The feature service can respond to an inquiry for "FEATURE1" indicating that the feature is active if a local time of a requester of the inquiry is at least 1:00 AM on Jul. 23, 2020, for example. Otherwise, the feature service can respond to the inquiry by informing the requester that the feature is not active. The user interface 300 or another user interface can be used by an administrator to deactivate a feature. For example, the entries in the UI control 306 and the UI control 308 can be cleared and the save control 310 selected to deactivate a selected feature.

FIG. 3B illustrates example pseudocode 350 for feature activation. The pseudocode 350 includes code for a method 352 of a feature service and client code 354 for a client of the feature service. The client code 354 includes a test 356 that involves sending a request to the feature service to determine whether a FEATURE1 feature is active. The request includes an indication of FEATURE1 and a local timestamp. The feature service can return a value of true if the feature is active given the local time, and false otherwise. A conditional code block 358 can be executed if the feature is active, and skipped otherwise.

The method 352 of the feature service is an example implementation of a method for checking to see if a feature is active. The method 352 can include a call 360 to look up activate time information (e.g., in a feature activation database) for the requested feature. The call 360 can be for a different method of the feature service or a call to another service. The look up can be configured to return retrieved activate time information for the requested feature or a value of null if no activate time exists for the requested feature.

The method 352 can include different tests regarding the retrieved activate time information. For example and as shown in a test 362, if the activate time information is null, the method 352 can return false, indicating the feature is not active for the requester. As another example and as shown in a test 364, if the local time of the request is greater than or equal to a non-null activate time, the method can return true, indicating that the feature is active for the requester. Timestamp information can be represented by values where larger values represent later times, for example. If the local time is less than the activate time, the method 352 can return false, indicating that the feature is not active for the requester. Other types of tests and implementations can be used for the method 352.

Figure 4:
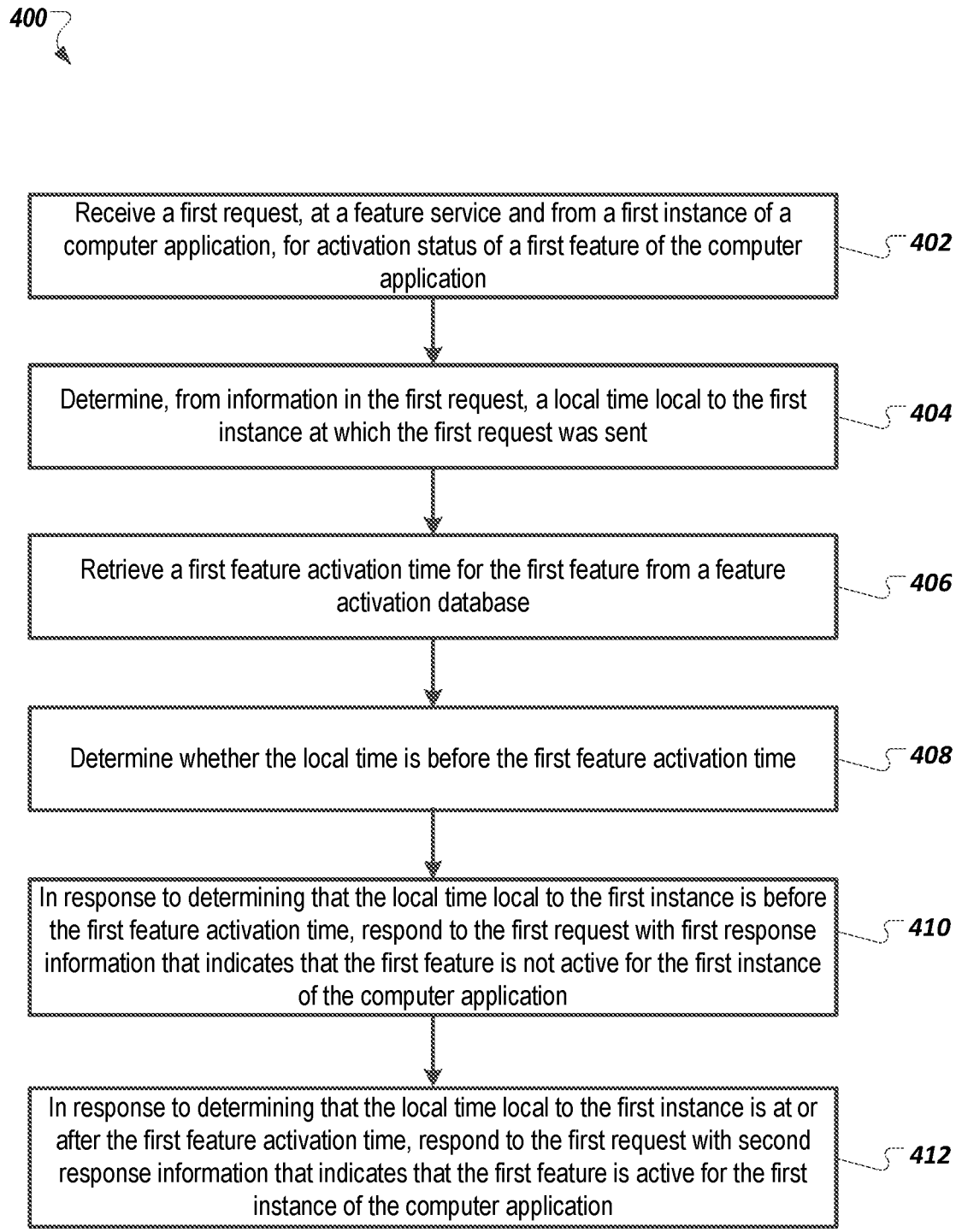
FIG. 4 is a flowchart of an example method for automatic application feature activation/deactivation across time zones.

FIG. 4 is a flowchart of an example method for automatic application feature activation/deactivation across time zones. It will be understood that method 400 and related methods may be performed, for example, by any suitable system, environment, software, and hardware, or a combination of systems, environments, software, and hardware, as appropriate. For example, one or more of a client, a server, or other computing device can be used to execute method 400 and related methods and obtain any data from the memory of a client, the server, or the other computing device. In some implementations, the method 400 and related methods are executed by one or more components of the system 100 described above with respect to FIG. 1. For example, the method 400 and related methods can be executed by the feature service 114 of FIG. 1.

At 402, a first request is received at a feature service and from a first instance of a computer application, for activation status of a first feature of the computer application.

At 404, a local time local to the first instance at which the first request was sent is determined from information in the first request.

At 406, a first feature activation time is retrieved for the first feature from a feature activation database.

At 408, a determination is made as to whether the local time is before the first feature activation time.

At 410, in response to determining that the local time local to the first instance is before the first feature activation time, a response to the first request is sent with first response information that indicates that the first feature is not active for the first instance of the computer application.

At 412, in response to determining that the local time local to the first instance is at or after the first feature activation time, a response is sent to the first request with second response information that indicates that the first feature is active for the first instance of the computer application.

The feature service can receive, while the first feature is active for the first instance, a request from a second instance of the computer application. The different instances of the computer application can be different instances installed on different computing devices that are at different locations. The feature service can determine that a time local to the second instance is before the feature activation time for the first feature. Accordingly, the feature service can respond to the request from the second instance with information that indicates that the first feature is not active for the second instance. The feature service can later receive a request from the second instance when the local time local to the second instance is after the feature activation time of the first feature, and the feature service can inform the second instance that the first feature is now active for the second instance.

The feature service can monitor system health data for at least one system corresponding to the first instance and/or the second instance. The feature service can determine, based on monitored system health data, that an issue may be attributable to activation of the first feature. The feature service can automatically deactivate the first feature in response to determining that the issue may be attributable to activation of the first feature. The feature service can respond to subsequent status requests for the first feature with an indication that the first feature is no longer active.

Figure 5:
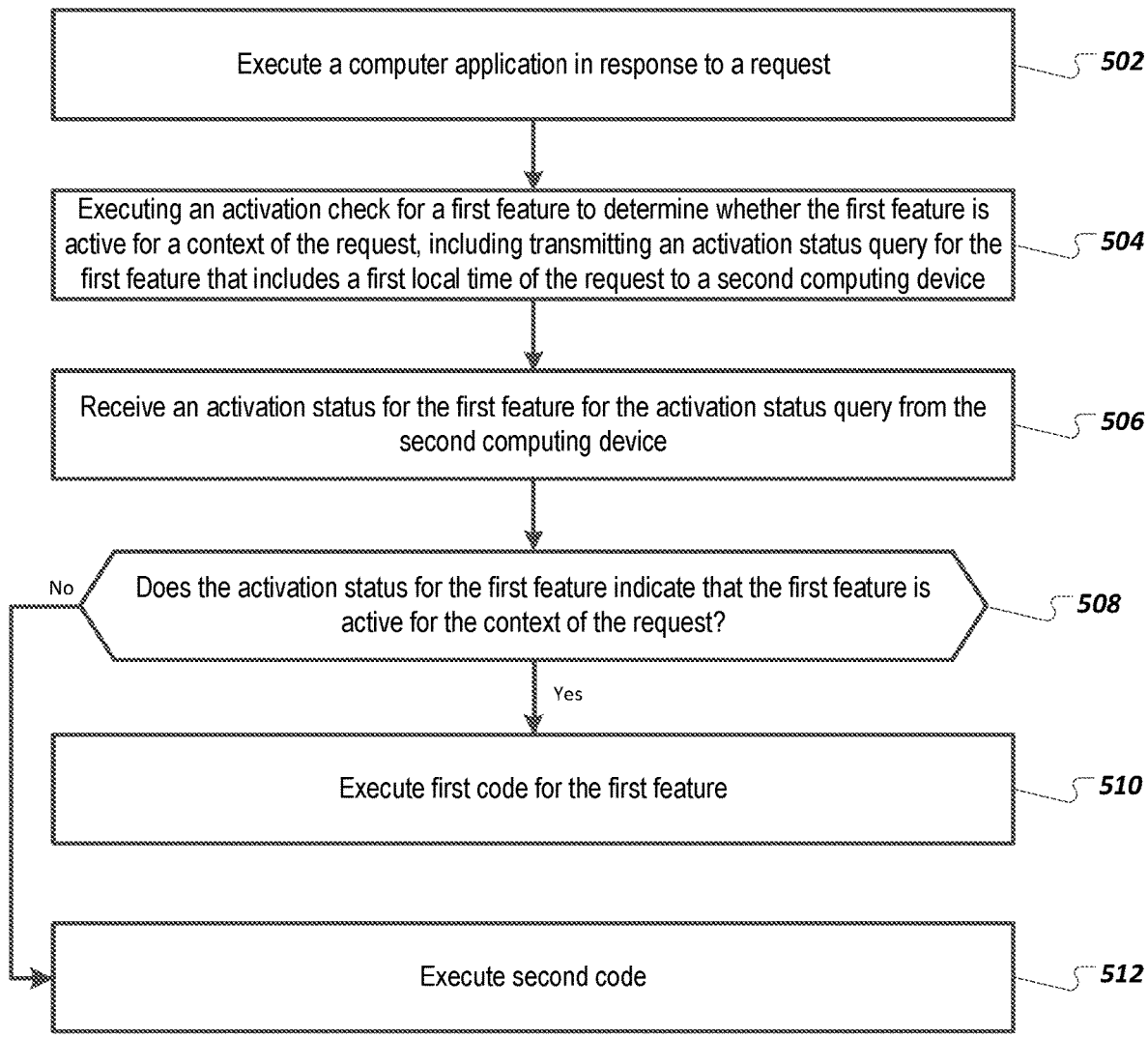
FIG. 5 is flowchart of an example method for responding to a feature activation status query response.

FIG. 5 is flowchart of an example method 500 for responding to a feature activation status query response. It will be understood that method 500 and related methods may be performed, for example, by any suitable system, environment, software, and hardware, or a combination of systems, environments, software, and hardware, as appropriate. For example, one or more of a client, a server, or other computing device can be used to execute method 500 and related methods and obtain any data from the memory of a client, the server, or the other computing device. In some implementations, the method 500 and related methods are executed by one or more components of the system 100 described above with respect to FIG. 1. For example, the method 500 and related methods can be executed by the client application 128 or the microservice 134*a* of FIG. 1.

The method 500 can be for executing a computer application on a first computing device, where the computer application includes first code for a first feature that must be activated before the first code is executed and second code.

At 502, the computer application is executed in response to a request.

At 504, an activation check is executed for the first feature to determine whether the first feature is active for a context of the request. Executing the activation check includes transmitting an activation status query for the first feature that includes a first local time of the request to a second computing device. The second computing device determines an activation status for the first feature for the activation status query based on whether the first local time of the request is equal to or after a feature activation time for the first feature.

At 506, the activation status for the first feature for the activation status query is received from the second computing device.

At 508, a determination is made as to whether the received activation status for the first feature indicates that the first feature is active for the context of the request.

At 510, the first code for the first feature is executed in response to determining that the activation status for the first feature indicates that the first feature is active for the context of the request.

At 512, the second code is executed in response to determining that the activation status for the first feature indicates that the first feature is not active for the context of the request.

In some implementations, the first code can be alternative code to the second code, where the second code is not executed during a first execution of the computer application in which the first code is executed and where the second code is executed during a second execution of the computer application in which the first code is not executed. The first code can be a revised version of the second code. The second code can be executed unconditionally during a first execution of the computer application regardless of whether the first code is executed during the first execution of the computer application. The first computing device can be a server computing device that executes server code on behalf of multiple client devices associated with multiple different users. The first computing device can be a client device associated with a first user.

Figure 6:
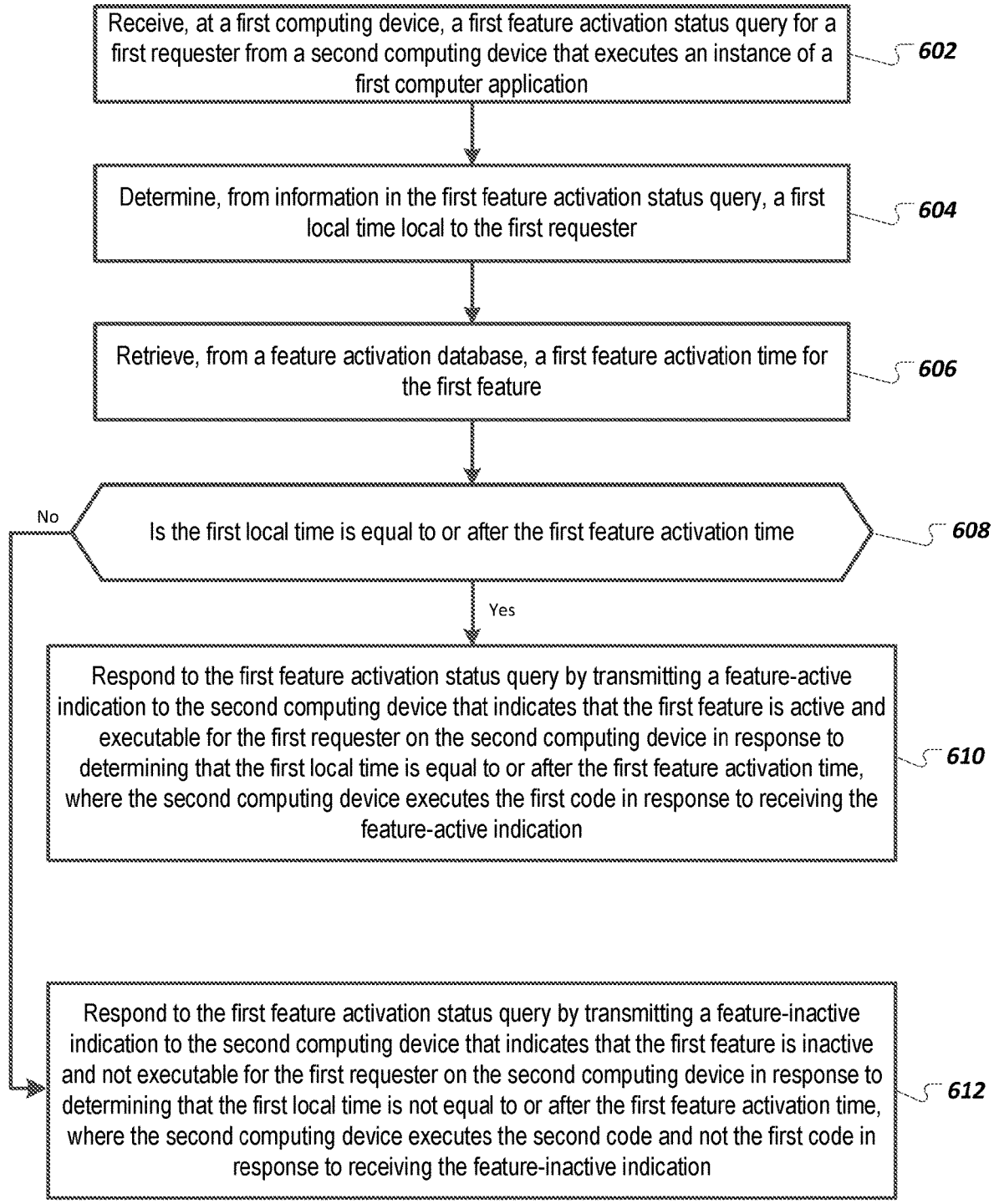
FIG. 6 is a flowchart of an example method for receiving and responding to a feature activation status query.

FIG. 6 is a flowchart of an example method 600 for receiving and responding to a feature activation status query. It will be understood that method 600 and related methods may be performed, for example, by any suitable system, environment, software, and hardware, or a combination of systems, environments, software, and hardware, as appropriate. For example, one or more of a client, a server, or other computing device can be used to execute method 600 and related methods and obtain any data from the memory of a client, the server, or the other computing device. In some implementations, the method 600 and related methods are executed by one or more components of the system 100 described above with respect to FIG. 1. For example, the method 600 and related methods can be executed by the feature service 114 of FIG. 1.

The method 600 can be executed on a first computing device that includes a feature activation database where at least one entry in the feature activation database has a feature identifier and a feature activation time and where the at least one entry is associated with a first feature of a first computer application having first code for the first feature that must be activated before the first code is executed and second code.

At 602, a first feature activation status query is received from a second computing device that executes an instance of the first computer application, where the first feature activation status query inquires whether the first feature is active for a first requester.

At 604, a first local time local to the first requester is determined from information in the first feature activation status query.

At 606, retrieving, a first feature activation time for the first feature is retrieved from the feature activation database.

At 608, a determination is made as to whether the first local time is equal to or after the first feature activation time.

At 610, a response is sent to the first feature activation status query by transmitting a feature-active indication to the second computing device that indicates that the first feature is active and executable for the first requester on the second computing device in response to determining that the first local time is equal to or after the first feature activation time. The second computing device executes the first code in response to receiving the feature-active indication.

At 612, a response is sent to the first feature activation status query by transmitting a feature-inactive indication to the second computing device that indicates that the first feature is inactive and not executable for the first requester on the second computing device in response to determining that the first local time is not equal to or after the first feature activation time, where the second computing device executes the second code and not the first code in response to receiving the feature-inactive indication.

In some implementations, the second computing device can be a server computing device that executes server code on behalf of multiple client devices associated with multiple different users and the first requester can be a first client device. The second computing device can be a client device associated with a first user. After responding to the first feature activation status query by transmitting the feature-active indication to the second computing device that indicates that the first feature is active and executable for the first requester on the second computing device, a second feature activation status query can be received for the first feature from a third computing device for a second requester. A determination can be made that a second local time local to the second requester is before the first feature activation time. A response can be sent, while the first feature is active for the first requester, for the second feature activation status query by transmitting a feature-inactive indication to the third computing device that indicates that the first feature is inactive and not executable for the second requester on the third computing device. After responding to the second feature activation status query by transmitting the feature-inactive indication to the third computing device that indicates that the first feature is inactive and not executable for the second requester on the third computing device, a third feature activation status query can be received for the first feature from the third computing device for the second requester. A determination can be made that a third local time local to the second requester is after the first feature activation time. A response can be sent for the third feature activation status query by transmitting the feature-active indication to the third computing device that indicates that the first feature is active and executable for the second requester on the third computing device. System health data can be monitored for at least one system corresponding to the computer application. A determination can be made, based on monitored system health data, that an issue is attributable to activation of the first feature. The first feature can be automatically deactivated in response to determining that the issue may be attributable to activation of the first feature. A notification can be sent to an administrator in response to determining that the issue may be attributable to activation of the first feature. Monitored system health data can be general health data associated with multiple features and/or feature-specific health data specific to the first feature. After the first feature has been deactivated and after the second computing device has previously executed the first code at least once, a second feature activation status query can be received for the first feature from the second computing device for the first requester. A determination can be made that the first feature has been deactivated. Based on determining that the first feature has been deactivated, a response can be sent for the second feature activation status query by transmitting a feature-inactive indication to the second computing device that indicates that the first feature is inactive and not executable for the first requester on the second computing device.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method for executing a computer application on a first computing device, wherein the computer application includes, among other code, conditional first code for a first feature and second code, wherein execution of the conditional first code is conditioned on the first feature being active, the method comprising:
    receiving an application-execution request for the computer application;
    executing the computer application in response to the application-execution request, wherein executing the computer application in response to the application-execution request comprises:
        executing an activation check for the first feature to determine whether the first feature is active for a context of the application-execution request, wherein executing the activation check comprises transmitting, to a second computing device, an activation status query for the first feature that includes a first local time of the application-execution request that is local to the first computing device, wherein the second computing device is configured to determine an activation status for the first feature for the activation status query based on whether the first local time of the application-execution request is equal to or after a preconfigured feature activation time for the first feature;
        receiving the activation status for the first feature for the activation status query from the second computing device;
        executing the conditional first code for the first feature in response to determining that the activation status for the first feature indicates that the first feature is active for the context of the application-execution request; and
        executing the second code in response to determining that the activation status for the first feature indicates that the first feature is not active for the context of the application-execution request.

2. The computer-implemented method of claim 1, wherein the conditional first code is a revised version of the second code.

3. The computer-implemented method of claim 1, further comprising executing the second code.

4. The computer-implemented method of claim 1, wherein a type of the first computing device is a server computing device type.

5. The computer-implemented method of claim 1, wherein a type of the first computing device is a client device type and wherein the first computing device is associated with a first user.

6. A computer-implemented method executed on a first computing device that includes a feature activation database where at least one entry in the feature activation database includes a feature identifier and a feature activation time and where the at least one entry is associated with a first feature of a first computer application, wherein the first computer application has conditional first code for the first feature and second code, wherein execution of the conditional first code is conditioned on the first feature being active, the method comprising:
    receiving a first feature activation status query from a second computing device that is currently executing the first computer application, where the first feature activation status query inquires whether the first feature is active on the second computing device for a first user;
    determining, from information in the first feature activation status query, a first local time local to the second computing device;
    retrieving, from the feature activation database, a first feature activation time for the first feature;
    determining whether the first local time is equal to or after the first feature activation time;
    responding to the first feature activation status query by transmitting a feature-active indication to the second computing device that indicates that the first feature is active and executable for the first user on the second computing device in response to determining that the first local time is equal to or after the first feature activation time, where the second computing device executes the conditional first code in response to receiving the feature-active indication; and
    responding to the first feature activation status query by transmitting a feature-inactive indication to the second computing device that indicates that the first feature is inactive and not executable for the first user on the second computing device in response to determining that the first local time is not equal to or after the first feature activation time, where the second computing device executes the second code and not the conditional first code in response to receiving the feature-inactive indication.

7. The computer-implemented method of claim 6, wherein a type of the second computing device is a server computing device type.

8. The computer-implemented method of claim 6, wherein a type of the second computing device is a client device type and wherein the second computing device is associated with the first user.

9. The computer-implemented method of claim 6, further comprising:
    after responding to the first feature activation status query by transmitting the feature-active indication to the second computing device that indicates that the first feature is active and executable for the first user on the second computing device, receiving a second feature activation status query for the first feature from a third computing device for a second user;
    determining that a second local time local to the third computing device is before the first feature activation time; and
    responding, while the first feature is active for the first user, to the second feature activation status query by transmitting a feature-inactive indication to the third computing device that indicates that the first feature is inactive and not executable for the second user on the third computing device.

10. The computer-implemented method of claim 9, further comprising:
 after responding to the second feature activation status query by transmitting the feature-inactive indication to the third computing device that indicates that the first feature is inactive and not executable for the second user on the third computing device, receiving a third feature activation status query for the first feature from the third computing device for the second user;
 determining that a third local time local to the third computing device is after the first feature activation time; and
 responding to the third feature activation status query by transmitting the feature-active indication to the third computing device that indicates that the first feature is active and executable for the second user on the third computing device.

11. The computer-implemented method of claim 6, further comprising:
 determining first health data for the second computing device corresponding to a first time period in which the first feature is not active for the second computing device;
 determining second health data for the second computing device corresponding to a second time period in which the first feature is active for the second computing device;
 determining a difference between the first health data and the second health data;
 determining, based on the difference between the first health data and the second health data, that an issue is attributable to activation of the first feature; and
 automatically deactivating the first feature in response to determining that the issue is attributable to activation of the first feature.

12. The computer-implemented method of claim 11, further comprising sending a notification to an administrator device in response to determining that the issue may be attributable to activation of the first feature.

13. The computer-implemented method of claim 11, wherein the first health data and the second health data include health data associated with multiple features that include the first feature and at least one other feature different from the first feature.

14. The computer-implemented method of claim 11, wherein the first health data and the second health data include feature-specific health data that relates to the first feature and not other application features.

15. The computer-implemented method of claim 11, further comprising:
 receiving, after the first feature has been deactivated and after the second computing device has previously executed the conditional first code at least once, a second feature activation status query for the first feature from the second computing device;
 determining that the first feature has been deactivated; and
 based on determining that the first feature has been deactivated, responding to the second feature activation status query by transmitting a feature-inactive indication to the second computing device that indicates that the first feature is inactive and not executable on the second computing device.

16. A system comprising:
 a first computing device; and
 a computer-readable medium coupled to the first computing device having instructions stored thereon which, when executed by the first computing device, causes the first computing device to perform operations for a computer application that includes, among other code, conditional first code for a first feature and second code, wherein execution of the conditional first code is conditioned on the first feature being active, the operations comprising:
  receiving an application-execution request to execute the computer application;
  executing the computer application in response to the application-execution request, wherein executing the computer application in response to the application-execution request comprises:
   executing an activation check for the first feature to determine whether the first feature is active for a context of the application-execution request, wherein executing the activation check comprises transmitting, to a second computing device, an activation status query for the first feature that includes a first local time of the application-execution request that is local to the first computing device, wherein the second computing device is configured to determine an activation status for the first feature for the activation status query based on whether the first local time of the application-execution request is equal to or after a preconfigured feature activation time for the first feature;
   receiving the activation status for the first feature for the activation status query from the second computing device;
   executing the conditional first code for the first feature in response to determining that the activation status for the first feature indicates that the first feature is active for the context of the application-execution request;
  and
   executing the second code in response to determining that the activation status for the first feature indicates that the first feature is not active for the context of the application-execution request.

17. The system of claim 16, wherein the conditional first code is a revised version of the second code.

18. The system of claim 16, wherein the operations further comprise executing the second code.

* * * * *